UNITED STATES PATENT OFFICE.

ALEXANDER HERZFELD, OF BERLIN, GERMANY, ASSIGNOR, BY MESNE ASSIGNMENTS, TO THE CHEMICAL FOUNDATION, INC., A CORPORATION OF DELAWARE.

NUTRIMENT-CONTAINING ALBUMEN AND THE METHOD OF PRODUCING IT.

1,391,683.     Specification of Letters Patent.     Patented Sept. 27, 1921.

No Drawing.     Application filed April 15, 1918. Serial No. 228,755.

*To all whom it may concern:*

Be it known that I, Dr. ALEXANDER HERZFELD, chemist, a subject of the German Emperor, residing at and whose post-office address is Berlin, N. 65, Amrumerstrasse, Germany, have invented certain new and useful Improvements in Nutriment-Containing Albumen and the Method of Producing It; and I do hereby declare the following to be a full, clear, and exact description of the invention, such as will enable others skilled in the art to which it appertains to make and use the same.

My invention refers to a nutriment containing albumen, and more especially to the method of producing it, and its particular object is a method allowing such a nutriment of superior quality to be obtained readily.

As is well known to those skilled in the art, by concentrating a mixture of moist yeast and sugar, brown-colored syrup-like products are obtained which, according to whether the raw materials were more or less pure, on account of their high percentage of albumen and similar nitrogen compounds as well as carbohydrates form a superior fodder and also a very wholesome nutriment for human consumption.

It has further been proposed to produce a nutriment of syrup-character by admixing to pressed and partly dried yeast 25 per cent. grape-sugar and some starch.

In most cases however yeast, either in fresh condition or revived by renewing it with an excess of a sugar solution, has been heated and concentrated to form a syrup, or else the yeast has been sterilized with a boiling sugar solution without any further addition, the product resulting from this treatment being then mixed with suitable powdered substances.

In practical operation, however, none of the methods mentioned above allows of producing a uniform and homogeneous product.

By using the method forming the object of my invention the native albuminous compounds as well as the sugar suffer decomposition only to the lowest possible degree and products of pleasant taste are obtained at the lowest possible expense. To this end grape-sugar and starch-sugar whose solutions are known to suffer on being concentrated at high temperature, as well as other reducing sugars are dispensed with entirely, and in their stead only beet-root sugar or cane sugar are employed. In employing saccharose in the older methods mentioned above fresh or sterilized yeast was simply mixed with sugar or a sugar solution and then concentrated if necessary. When using these methods, however, it is impossible to avoid part or all of the sugar being inverted and highly decomposed by the invertase of the yeast or by the free acids formed during concentration.

I have succeeded in obviating this drawback by employing in the production of the desired products merely such yeast as has previously been treated with free caustic alkali and more especially caustic soda (not the carbonates) in the following manner.

To the yeast is added a slight excess of caustic alkali (about 0.05 to 0.10 per cent. caustic soda NaOH) and the mixture is heated to 100 degr. C. If no alkalinity can be ascertained thereafter, some more alkali is added and heating is continued. This treatment is repeated until after heating the mass still presents a distinct alkaline reaction. Yeast sterilized after this manner proves to be absolutely free of invertase and in consequence thereof cannot convert cane-sugar into invert-sugar. On the other hand owing to its slightly alkaline reaction it prevents any free acid from being formed and the sugar from being inverted during the concentration of the solution, to which sugar has been added. The sterilized yeast is freed from water to such a degree that after the addition of sugar no further concentration is required.

If it is contemplated, for instance, to obtain from a yeast containing 90 per cent. water, products containing two parts sugar to one part yeast, I prefer removing the greater part of the water, say 60 per cent., by direct evaporation at less than 100 degr. C. before sugar is added, a sugar containing solution being less ready to set free the water. Care should be taken, however, not to go so far in drying the sterilized yeast as to leave only as much water in it as is theoretically sufficient to dissolve the sugar; for in such a case it will prove impossible to dissolve the sugar. Therefore in the case mentioned above not more than about 60 parts of water may be removed, and two parts of sugar are then added, the resulting solution being evaporated until a syrup-like product is obtained.

For the reasons stated above, in contradistinction to the older methods this can be effected without any further precaution.

After the mixture of sugar and yeast has been freed from water to the desired extent, the inversion of the sugar is proceeded with by adding to the mass a predetermined quantity, about 5 and not more than 10 per cent., of fresh yeast rich in invertase. According to the time of treatment with the fresh yeast (from one half hour to 24 hours according to the quantity of fresh yeast and to its content of invertase) it is then possible to form a greater or smaller quantity of invert-sugar and thereby to reduce to a minimum the quantity of invert-sugar adapted to be destroyed during the ultimate heating and to impart to the mass a brown color.

After the sugar is inverted the mass is heated to nearly the boiling point, not above 108 degr. C., so as to evaporate the water added with the fresh yeast and to impart a pleasant taste to the product. In order to prevent as far as possible a far-reaching decomposition of the carbohydrates and albuminous compounds, the heating should not be carried as far as the boiling point by any means.

I claim:—

1. The process for producing an albuminous nutriment from waste yeast and sugar-juices containing saccharose which consists in sterilizing moist yeast by adding alkali and heating, then freeing the mass from water by evaporation, then adding saccharose, concentrating to a syrup-like consistency, partly inverting the sugar by means of fresh yeast and heating to nearly the boiling point.

2. In the process of producing an albuminous nutriment from waste yeast and sugar juices containing saccharose the step of heating the yeast with free caustic alkali before mixing it with the sugar.

3. The herein described nutriment material, said material being a stable syrupy product of uniform and homogeneous character which contains a high percentage of albumen and similar nitrogen compounds together with saccharose and invert sugar.

4. The process of producing an albuminous nutriment from waste yeast and saccharose, which comprises mixing sterilized yeast with saccharose, concentrating said mixture to the consistency of a syrup, partly inverting the saccharose by addition of fresh yeast and heating to nearly the boiling point.

5. The process of producing an albuminous nutriment from waste yeast and saccharose which consists in heating the yeast to about 100° C. with caustic soda, evaporating to remove about 60% of the water content, adding thereto saccharose, concentrating to a consistency of a syrup, partly inverting the saccharose by means of fresh yeast and heating to a temperature of less than 108° C.

In testimony whereof I have affixed my signature, in presence of two witnesses.

ALEXANDER HERZFELD.

Witnesses:
GEORG LÉNÁRT,
PAUL OPPERMANN.